United States Patent Office 3,275,808
Patented Sept. 27, 1966

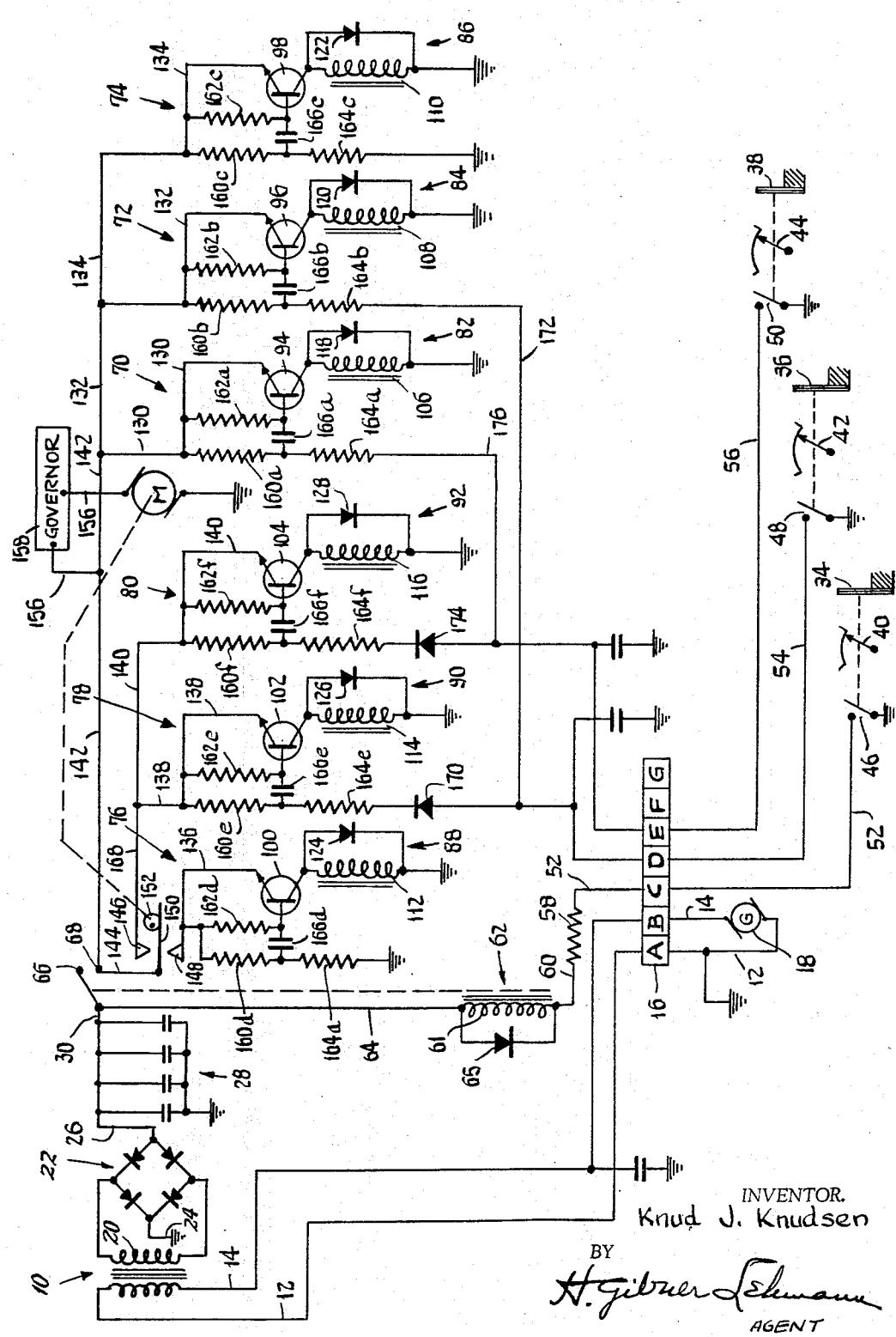

3,275,808
CORRELATING TIME AND EVENT RECORDER
Knud J. Knudsen, Middlebury, Conn., assignor to Lewis Engineering Company, Naugatuck, Conn., a corporation of Connecticut
Filed Aug. 27, 1962, Ser. No. 219,558
15 Claims. (Cl. 235—92)

This invention relates to electrically operated recording devices, and more particularly to recorders which indicate and correlate the occurrence of certain events and the durations thereof.

The invention is illustrated and described in the following specification and the drawings in connection with variables comprising conditions of temperature, whereby the attainment of certain temperatures will be recorded, as well as the total time during which the said temperatures exist. However, it should be understood that the invention is not limited to use solely in the recording and timing of temperature conditions, but instead has utility in connection with other variables, to indicate magnitude changes or the occurrence and duration of events of all kinds.

An object of the invention is to provide a novel and improved simplified, correlating electronic time and event recorder which will register or record the number of occurrences of a specified event or condition and also the total time during which the condition existed.

Another object of the invention is to provide an improved time and event recorder as above set forth, which will indicate the occurrence of a plurality of specified conditions (preferably of like character), and also indicate the total time or duration of each of said conditions, where the occurrence of one condition is a prerequisite to attainment or occurrence of another condition.

A further object of the invention is to provide an improved apparatus in accordance with the foregoing, which will operate on but little power, which is especially reliable in its functioning, and wherein momentary operating power of relatively appreciable magnitude, considering the rating of the components, is utilized without danger of overheating or overloading of the same.

A feature of the invention resides in the provision of an improved time and event recorder of the type outlined, wherein a novel circuitry and component organization is provided to enable delicate, automatically controlled switch contacts to effect relatively strong pulse energization of counter or recorder devices and relays associated therewith, thereby to reduce power requirements, increase contact life, and minimize loading of heat-sensitive components.

Another feature of the invention resides in the provision of an improved electrical indicator and/or recorder apparatus in accordance with the foregoing, wherein reliable isolation of coupled or connected circuits is had in a simple and effective manner.

Other features and objects of the invention involve the provision of relatively simple and straightforward circuitry, the use of relatively few components, and the characteristics of light weight, compactness, and relatively small size.

Still other features and advantages will hereinafter appear.

The accompanying drawing is a schematic circuit diagram of the improved time and event recorder device as provided by the invention.

Referring to the illustrated circuit there is shown a power supply comprising a step-down transformer 10 having primary leads 12 and 14 connected through a terminal block or fitting 16 to a power source or generator 18. The secondary 20 of the transformer 10 is connected to a bridge rectifier 22 having one output terminal grounded at 24 (the positive terminal) whereas the negative terminal is connected by a wire 26 with a bank of filter capacitors 28 to provide a smoothed negative D.C. output voltage at the wire 30.

The present time and event recording apparatus is shown as being utilized, in the schematic representation illustrated, to indicate or record the attainment of certain temperatures at particular locations in an engine, as for example a jet aircraft engine. The apparatus responds to the attainment of three specified temperatures, first a temperature of 700° C., second a temperature of 745° C., and third a temperature of 790° C. To represent the heat-responsive elements for sensing such temperatures there are shown, for illustrative purposes only, three bimetallic elements or strips 34, 36 and 38, such elements being associated with instrument pointers 40, 42 and 44 respectively, and being further coupled to electric switches 46, 48 and 50 respectively. Each assemblage comprising a bimetallic element, indicator or pointer and automatically controlled switch as diagrammatically represented may be thought of as a temperature-responsive instrument and associated circuit which is automatically controlled thereby.

By the present invention, pairs of counters, a power operated timing switch, and relay means are provided for connection to the D.C. power source and to the temperature controlled switches 46, 48 and 50 to provide in a simple and reliable manner and with relatively little power consumption a recording of the number of times that the switches 46, 48 and 50 are closed (indicating the attainment of the respective temperatures set forth above) together with recording of the total time or duration that such temperatures existed. The organization comprising the counters and relays is such that the switches 46, 48 and 50 in the temperature-responsive instruments may have a current capacity of as little as 20 milliamperes at 50 volts. Such switches may be of the snap-action type commonly known as "microswitches."

Accordingly, referring to the circuit diagram, one pole of each of the switches 46, 48 and 50 is brought to ground as indicated, and the remaining terminals are connected with wires 52, 54 and 56, which are brought through the terminal block or fitting 16, the wires 54 and 56 being suitably bypassed to ground through capacitors as shown. The wire 52 is connected with a current limiting resistor 58, which latter is joined by a wire 60 to the coil 61 of a sensitive relay 62, such coil being connected by a wire 64 with the negative supply wire 30 of the power source. A surge reducing rectifier 65 is connected across the relay coil 61, as shown, and the wires 30 and 64 are connected to one contact 66 of the relay 62. The relay 62 has a cooperable contact 68 which is connected to provide energy to three event counters or counter assemblages 70, 72 and 74, said counters respectively including sensitive pulse-type relay means shortly to be described. Paired with the three counters 70, 72 and 74 are timing counters or counter assemblages 76, 78 and 80 respectively, such counters also receiving energy through the relay contacts 66, 68 and also respectively including pulse-type relay means to be described.

The relay means of each of the counters 70–80 comprise transistors having input and output circuits, the latter including magnetic motive devices comprising the driving coils of electrical counter mechanisms 82, 84, 86, 88, 90 and 92.

The circuitry of each of the transistor relay means is mostly similar to that of the others. Npn silicon transistors 94, 96, 98, 100, 102 and 104 have their collectors respectively connected with driving coils 106, 108, 110, 112, 114 and 116 of the electric counter mechanisms 82–92 respectively. The remaining ends of the driving coils 106–116 of the counter mechanisms are grounded, and semiconductor diodes 118–128 respectively are shunted across the driving coils to absorb the induced E.M.F. at such time that the coils are deenergized by virtue of the transistors being rendered nonconducting. The driving coils 106–116 comprise the loads in the output circuits of the transistors 94–104. Such output circuits also include the emitters of the transistors, which are respectively connected to wires 130–140. The wires 130, 132 and 134 are connected with each other and joined by a wire 142 to the relay contact 68, to be energized thereby.

Associated with the load circuit wires 136, 138 and 140 of the timing counters 76, 78 and 80 is a power-operated timing switch 144 having stationary contacts 146 and 148, and having a movable contact 150 which is reciprocated by a cam 152 mechanically coupled to a timing motor 154. One terminal of the motor 154 is connected to ground, and the remaining terminal is connected by a wire 156 through a governor device 158 to the line 142 which is energized through the relay contacts 66, 68.

The transistor relays 70–80, for the purpose of producing pulse-type outputs, further include resistor-capacitor networks connected respectively with the wires 130–140. The resistor-capacitor networks are identical with each other, and comprise resistors 160a to 160f, 162a to 162f, and 164a to 164f; also capacitors 166a to 166f, these components having the connections shown.

The wires 138 and 140 are connected together and joined to the stationary timing switched contact 146 by a wire 168. The wire 136 is connected with the stationary timing switch contact 148. The resistor 164d is connected to ground. The resistor 164e is connected to a semiconductor diode 170 which is connected with the wire 54. The resistor 164b is connected by a wire 172 with the wire 54. The resistor 164f is connected to a semiconductor diode 174 which is in turn connected to the wire 56. The resistor 164a is connected by a wire 176 to the wire 56. These connections complete the control circuit of the transistor relay means forming part of the counters 70–80.

The above organization has a number of desirable features and advantages. It will be noted that the input circuits of the counters 72 and 78 are connected or coupled together, and this same is true of the counters 70 and 80. By the provision of the semiconductor diodes 170 and 174 an isolation of the input circuit of these paired counters is had, whereby operation of the timing counter 78 will not influence the event counter 72, and operation of the timing counter 80 will not influence the event counter 70. This action is aided also by the semiconductor diodes 118, 120, 126 and 128 which effectively absorb the induced E.M.F. of the driving coils or motive means of the counter mechanisms, when such coils are deenergized in response to the associated transistor relay being rendered nonconducting. The above diodes, and also the diodes 122 and 124 together with the diode 65 minimize interference between various components of the circuit illustrated as well as interference with adjoining radio or other equipment, by preventing any appreciable back spike or surge resulting from the high induced voltage in the coils.

The provision of the resistor-capacitor networks in the transistor relays prevents overheating and overloading of the transistors as well as the associated coils in the load circuits of these relays, as will be explained later in connection with the operation of the apparatus, and this is an important feature of the invention.

Operation of the circuit and components described above is as follows:

Assuming that the power supply 18 comprising the generator or other source is operating, the ground of the system will be at a positive potential, and the power lead 30 will have a negative D.C. voltage which may be on the order of 30 volts.

When the engine temperature reaches a value of 700° C., the heat responsive element 34 will effect a closing of the automatically controlled switch 46, and this will result in energization of the relay 62, closing the relay contacts 66, 68. Such action will energize the line wire 142, resulting in operation of the timing motor 154. The cam 152 driven thereby will accordingly oscillate the arm 150 of the timing switch 144. This action will effect a periodic negative energization of the wire 136; also, there will be a continuous energization of the wire 134. In consequence, the two counters 74, 76 will be placed in operation, in the following manner:

Considering first the counter 74, at the beginning of the energization of the wire 134 the capacitor 166c will be in a discharged condition, and accordingly a relatively high potential will exist across the resistor 162c, resulting in the transistor 98 being made conducting. This will cause energization of the coil 110 of the counter mechanism 86, and such energization will advance the counter by one unit. The condenser 166c will meanwhile become charged, and this will diminish the voltage across the resistor 162c to the extent that the transistor 98 will be rendered nonconducting. Thus, deenergization of the coil 110 of the counter mechanism 86 will occur, and such deenergization will continue to be maintained as long as the wire 134 continues to receive uninterrupted energy through the relay contacts 66, 68.

It will be noted at this point that in spite of a continuance of energization of the wire 134, the transistor 98 and the counter mechanism 86 after having once operated will now remain in a deenergized condition whereby they will not be likely to heat up or to fail for reasons of excessive current, etc. What occurs is a pulsed operation of the counter mechanism 86 and a momentary operation or conduction of the transistor 98, this action constituting an important feature of the invention.

Consider now the simultaneous functioning of the counter 76. Upon the movable contact 150 of the timing switch 144 engaging the stationary contact 148, the transistor 100 will be rendered conducting, resulting in a pulse being applied to the coil 112 of the counter mechanism 88. Thus, such counter will be advanced by one unit. The conducting action of the transistor 100 is the same as that already described above in connection with the transistor 98. As the capacitor 166d becomes fully charged, the drop across the resistor 162d decreases to the point where the transistor 100 is rendered nonconducting, thereby deenergizing the coil 112. Upon separation of the contacts 148, 150 such nonconduction will be continued but the capacitor 166d will discharge. With the next engagement between the contacts 150 and 148 of the timing switch 144 a repetition of this entire action will occur, whereby the counter 76 will be advanced another unit. The speed of the timing motor 154 and the cam 152 are so arranged that the counter 76 is actuated once every second. Accordingly, the counter 76 will register the total number of seconds or the elapsed time during which the 700° temperature (or a higher temperature) exists. If the temperature should now drop to a value below 700° C., the automatically controlled microswitch 46 will be opened, thereby deenergizing the circuit. The timing counter 76 will indicate the number of seconds that the temperature existed at 700° or higher, and the event counter 74 will indicate the number 1, to signify that there was one such occurrence of a temperature above 700° C.

If the temperature of the engine now again exceeds 700° C., the automatically controlled switch 46 will again close, and the above operation will be repeated, with the event counter 74 this time indicating the number 2 and with the timing counter 76 continuing to add seconds to the previously set number. Thus, there will be recorded the number of instances that the temperature has reached or exceeded 700° C., as well as the total time that such temperature has existed at a value at or above this predetermined figure. The counters 72 and 78 are associated with a temperature value higher than 700° C., as for example a temperature of 745° C. When such temperature or a higher temperature is attained, the automatically controlled switch 48 is closed, and by an action similar to that described above in connection with the closing of the switch 46, the event counter 72 will record the number of times that the temperature has exceeded 745° C., and the timing counter 78 will record the total number of seconds that such temperature has existed.

The automatically controlled switch 50 is associated with the still higher temperature of 790° C. When such temperature (or a temperature higher than this) occurs, the counters 70 and 80 will be energized and rendered operative. The counter 70 will indicate the number of times that the engine temperature has reached or exceeded 790° C., and the counter 80 will indicate the total number of seconds during which such temperature has existed. The functioning of these counters for the two higher temperature ranges is similar to that described in connection with the counters associated with the temperature range of 700° C.

It may be again noted that the provision of the diodes 170 and 174 in the input or control circuit of the counters 78, 80 effect a unidirectional isolation of such circuits from the input circuits of the event counters 70, 72 respectively which is sufficient to prevent operation of the latter two counters during the periodic advance of the timing counters under the action of the timing switch 144.

It may be further noted that when the engine temperature reaches a value of 745° or higher, it presupposes that the counters 74 and 76 have been placed in operation, and that when the engine temperature reaches or exceeds 790° C. it presupposes that the counters 72, 74, 76 and 78 have been placed in operation.

Suitable well-known means (not shown) may be provided to effect a simultaneous resetting of all of the counter mechanisms 82–92 in response to operation of a single electrical switch or pushbutton.

It will now be understood from the foregoing that I have provided a novel and improved time and event recording apparatus having a number of distinct advantages and features. By virtue of the provision of the capacitors in the control or input circuits of the transistor relays, pulse operation of the counter mechanisms is had whereby there is eliminated continuous energization of such mechanisms, as well as continuous energization of the transistor devices. Accordingly, overheating and failure of such components is eliminated. The entire system may be operated on relatively low power, and the automatically controlled switches 46, 48 and 50 need not handle current in excess of 20 milliamperes at a rating of under 50 volts. The apparatus has a quick response time of approximately 35 milliseconds, and approximately 12 watts of power will be adequate to effect operation of the six transistor relays included in the six counters (three event counters and three timing counters). The quick current decay (in 35 milliseconds) results in the cam timing contacts breaking very inappreciable current, whereby they will have long life.

Approximate values of the components in the circuit illustrated, are as follows. The capacitors 166a–166f may be rated at 60 volts D.C., and may have a value of 22 microfarads each. The filter capacitors in the filter 28 may have a like value each. The bypass capacitors connected between the wires 54 and 56 and the ground may have a value of .01 mfd. at a rating of 1000 volts. The bypass capacitor connected between the wire 14 and ground may have a value of .1 mfd. and a rating of 500 volts D.C. The diodes in the rectifier bridge 22 may be of the type known commercially as 1N645. The diodes 118, 120, 122, 124, 126, 128, 170, 174 and 64, may be type PSO-81. The transistors 94–104 may be type 2N1716. The resistors 160a to 160f and 162a to 162f may be each of 4700 ohm value at one-half watt rating. The resistors 164a to 164f may have a value of 1800 ohms each and a rating of one-half watt. The resistor 58 may have a value of 560 ohms.

The apparatus as above set forth has been found to be extremely effective and reliable in its operation, and is capable of being assembled to occupy small space, in a compact arrangement. Relatively few components are involved, and these are incorporated in a simple and straightforward circuitry.

Variations and modifications may be made within the scope of the claims, and portions of the improvement may be used without others.

I claim:
1. A timing and event recorder comprising, in combination:
   (a) a pair of electrically-operated counters capable of independent advance,
   (b) means including a power-operated timing switch adapted to repeatedly open and close, for periodically advancing one of said counters to indicate elapsed time,
   (c) means including an automatically controlled switch, for simultaneously rendering operative said first-named means and also the other of said counters,
   (d) and reversibly - operative condition - responsive means, for reversibly actuating said automatically controlled switch,
   (e) said means which includes the automatically controlled switch further comprising a relay having a control circuit connected to said switch to limit the current therethrough,
   (f) a second pair of electrically-operated counters capable of independent advance, one of said second pair of counters being arranged for periodic advance by said means which includes the timing switch, to indicate elapsed time,
   (g) means under the control of said automatically controlled switch and including a second automatically controlled switch, for simultaneously rendering operative said second pair of counters,
   (h) a second reversibly-operative condition-responsive means for reversibly actuating said second automatically controlled switch,
   (i) magnetic motive devices,
   (j) relay means providing pulses of appreciable current capacity which are impressed on the motive devices to actuate the same, and
   (k) said relay means having low-current control circuits connected with the said second automatically controlled switch.

2. A timing and event recorder comprising in combination:
   (a) a pair of electrically-operated counters capable of independent advance,
   (b) means including a power-operated timing switch adapted to repeatedly open and close, for periodically advancing one of said counters to indicate elapsed time,
   (c) means including an automatically controlled switch, for simultaneously rendering operative said first-named means and also the other of said counters,
   (d) and reversibly - operative condition - responsive means for reversibly actuating said automatically controlled switch,
   (e) a second pair of electrically-operated counters capable of independent advance, one of said second pair of counters being arranged for periodic advance by said means which includes the timing switch, to indicate elapsed time,
   (f) means under the control of said automatically controlled switch and including a second automatically controlled switch, for simultaneously rendering operative said second pair of counters, and
   (g) a second reversibly-operative condition-responsive means for reversibly actuating said second automatically controlled switch.

3. A device as in claim 2, wherein:
   (a) the second condition-responsive means is of the same kind as the first and responds to the same condition but to a different degree.

4. A device as in claim 2, wherein:
(a) the second pair of counters have input circuits connected with each other and with the said second automatically controlled switch, and
(b) there is a rectifier in series with one of said input circuits to eliminate the influence of the same on the other input circuit.

5. A device as in claim 2, wherein:
(a) the power-operated timing switch has a plurality of circuits,
(b) the said one counter is connected with one of said circuits, and
(c) the said one counter of the second pair is connected to another of said circuits.

6. A device as in claim 2 characterized by:
(a) a third pair of electrically operated counters capable of independent advance, one of said third pair of counters being arranged for periodic advance by said means which includes the timing switch to indicate elapsed time,
(b) means under the control of said automatically controlled switch and including a third automatically controlled switch, for simultaneously rendering operative said third pair of counters, and
(c) a third reversibly-operative condition-responsive means for reversibly actuating said third automatically controlled switch.

7. A device as in claim 6, wherein:
(a) the third pair of counters have input circuits connected with each other and with said third automatically controlled switch, and
(b) there is a rectifier in series with one of said input circuits of the third pair of counters, to eliminate the influence of the same on the other input circuit of the third pair.

8. A device as in claim 6, wherein:
(a) the third condition-responsive means is of the same kind as the first and second, and responds to the same condition but to a different degree.

9. A device as in claim 2, wherein the second pair of electrically-operated counters comprise:
(a) magnetic motive devices, and
(b) relay means providing pulses of appreciable current capacity which are impressed on the motive devices to actuate the same,
(c) said relay means having low-current control circuits connected with the said second automatically controlled switch.

10. A device as in claim 9, wherein:
(a) the relay means include capacitors in their control circuits, the charging of the capacitors rendering the relay means nonconducting.

11. A device as in claim 10, wherein:
(a) there are resistive charging and discharging networks in the control circuits, connected with the capacitors.

12. A device as in claim 11, wherein:
(a) the relay means include transistors the control circuits of which incorporate said capacitors and resistive networks.

13. A device as in claim 6, wherein the second pair of electrically-operated counters comprise:
(a) magnetic motive devices, and
(b) relay means providing pulses of appreciable current capacity which are impressed on the motive devices to actuate the same,
(c) said relay means having low-current control circuits connected with the said second automatically controlled switch,
and wherein:
(d) the means for periodically advancing said one counter includes a D.C. supply, and
(e) the control circuit of the relay means of said one counter of the second pair includes a rectifier to limit current to one direction in the control circuit and thereby eliminate influence of the latter on other counters.

14. A device as in claim 13, wherein:
(a) there is a rectifier across the motive device of the said one counter of the second pair, to absorb back E.M.F. therefrom and thereby protect the associated relay means.

15. A device as in claim 6, wherein the second pair of electrically-operated counters comprise:
(a) magnetic motive devices, and
(b) relay means providing pulses of appreciable current capacity which are impressed on the motive devices to actuate the same,
(c) said relay means having low-current control circuits connected with the said second automatically controlled switch,
and wherein:
(d) the means for periodically advancing said one counter includes a D.C. supply, and
(e) the control circuits of the relay means of said one counter of the second and third pairs include rectifiers to limit current to one direction in the control circuits and thereby eliminate influence of the latter on other counters.

References Cited by the Examiner

UNITED STATES PATENTS 2,991,935   7/1961   Robson _____ 235—92
3,035,443   5/1962   Gray _____ 73—343.5

MAYNARD R. WILBUR, *Primary Examiner.*

MALCOLM A. MORRISON, DARYL W. COOK, J. F. MILLER, *Examiners.*